United States Patent
Shiba et al.

(10) Patent No.: US 9,799,865 B2
(45) Date of Patent: Oct. 24, 2017

(54) METHOD FOR PRODUCING SEPARATOR AND DEVICE FOR PRODUCING SEPARATOR

(71) Applicant: Sumitomo Chemical Company, Limited, Tokyo (JP)

(72) Inventors: Ryutaro Shiba, Niihama (JP); Yasutoshi Minemoto, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/333,677

(22) Filed: Oct. 25, 2016

(65) Prior Publication Data

US 2017/0125761 A1  May 4, 2017

(30) Foreign Application Priority Data

Oct. 30, 2015 (JP) ................. 2015-214892
Mar. 25, 2016 (JP) ................. 2016-062384

(51) Int. Cl.
  B05D 5/12 (2006.01)
  H01M 2/14 (2006.01)
  H01M 2/16 (2006.01)
  H01M 10/0525 (2010.01)

(52) U.S. Cl.
  CPC ......... *H01M 2/145* (2013.01); *H01M 2/1686* (2013.01); *H01M 10/0525* (2013.01)

(58) Field of Classification Search
  CPC combination set(s) only.
  See application file for complete search history.

(56) References Cited

U.S. PATENT DOCUMENTS

| 2005/0211033 A1* | 9/2005 | Matsuura ............... B26D 7/10 83/13 |
| 2008/0314512 A1 | 12/2008 | Bartsch |
| 2013/0220525 A1 | 8/2013 | Kunai |
| 2016/0190640 A1* | 6/2016 | Visco ............... H01M 10/0562 429/322 |

FOREIGN PATENT DOCUMENTS

| JP | 2000-208129 A | 7/2000 |
| JP | 2008-537912 A | 10/2008 |
| JP | 2011212550 A | 10/2011 |
| JP | 2012-084315 | 4/2012 |
| JP | 2012-114047 A | 6/2012 |

(Continued)

OTHER PUBLICATIONS

Office Action dated Jul. 14, 2016 in KR Application No. 10-2016-0064549.

(Continued)

*Primary Examiner* — Austin Murata
(74) *Attorney, Agent, or Firm* — Panitch Schwarze Belisario & Nadel LLP

(57) ABSTRACT

A method for producing a separator in accordance with an embodiment of the present invention includes: a removing step of removing both end parts of a separator original sheet in a width direction of the separator original sheet, the separator original sheet being transferred; and a coating step of coating, with coating for forming a heat-resistant layer, the separator original sheet whose both end parts have been removed in the removing step.

11 Claims, 7 Drawing Sheets

(56) References Cited

FOREIGN PATENT DOCUMENTS

| | | |
|---|---|---|
| JP | 2013-223957 A | 10/2013 |
| JP | 5785671 B1 | 9/2015 |
| KR | 10-0792255 B1 | 1/2008 |
| KR | 10-1284915 B1 | 7/2013 |
| WO | 2013099539 A1 | 7/2013 |

OTHER PUBLICATIONS

Office Action dated May 31, 2016 in JP Application No. 2016-062384.
Office Action dated Nov. 7, 2016 in KR Application No. 10-2016-0064549.
Office Action dated Feb. 20, 2017 in KR Application No. 10-2016-0064549.

* cited by examiner

METHOD FOR PRODUCING SEPARATOR AND DEVICE FOR PRODUCING SEPARATOR

This Nonprovisional application claims priority under 35 U.S.C. §119 on Patent Application No. 2015-214892 filed in Japan on Oct. 30, 2015 and Patent Application No. 2016-062384 filed in Japan on Mar. 25, 2016, the entire contents of which are hereby incorporated by reference.

TECHNICAL FIELD

The present invention relates to a method and a device for producing a separator.

BACKGROUND ART

In production of a separator which is used for a lithium-ion secondary battery or the like, a functional layer of various kinds is formed on a separator original sheet which serves as a base. In regard to such production of a separator, Patent Literature 1 discloses a method for producing a polyethylene microporous film which is a separator original sheet.

CITATION LIST

Patent Literature

[Patent Literature 1]
International Publication No. 2013/099539 (Publication Date: Jul. 4, 2013)

SUMMARY OF INVENTION

Technical Problem

In a typical production of a separator, while a separator original sheet unwound from a roll is transferred, a coating step of coating the separator original sheet with a material for a functional layer is carried out. However, the separator original sheet being transferred tends to sag at both end parts thereof, and have a flare at the both end parts, accordingly. In a case where a flare occurs at the both end parts of the separator original sheet, there is a problem that the material for the functional layer, with which the separator original sheet is coated in the coating step, has a non-uniform film thickness.

As a technique for preventing such an occurrence of a flare, it is possible to set a tension (unwinding tension) of the separator original sheet high. However, in a case where the tension of the separator original sheet is set high, there arise new problems that (i) the separator original sheet may break, (ii) a wrinkle (longitudinal wrinkle) at a part other than the both end parts of the separator original sheet is more likely to be formed, and (iii) the separator original sheet, which is soft, may be stretched out and deformed.

An aspect of the present invention has been accomplished in view of the problems, and an object of the present invention is to provide a method and a device for producing a separator, each capable of coating a separator original sheet with a material for a functional layer in a coating step so that the material has a uniform film thickness.

Solution to Problem

In order to attain the object, a method for producing a separator in accordance with an aspect of the present invention includes: a removing step of removing both end parts of a base film in a width direction of the base film, the base film being transferred; and a coating step of coating, with a material for forming a functional layer, the base film whose both end parts have been removed in the removing step.

In order to attain the object, a method for producing a separator in accordance with an aspect of the present invention includes: a removing step of removing both end parts of a base film in a width direction of the base film, the base film being transferred; a coating step of coating, with a material for forming a functional layer, one surface of the base film whose both end parts have been removed in the removing step; a second removing step of removing, from the base film having been coated with the material in the coating step, both end parts of the base film in the width direction of the base film; and a second coating step of coating, with a material for forming a functional layer, the other surface of the base film whose both end parts have been removed in the second removing step.

In order to attain the object, a device for producing a separator in accordance with an aspect of the present invention includes: a removing section for removing both end parts of a base film in a width direction of the base film, the base film being transferred; and a coating section for coating, with a material for forming a functional layer, the base film whose both end parts have been removed by the removing section.

With the configuration, before the base film is coated with the material by the coating section, the both end parts of the base film are removed by the removing section. This makes it possible to coat the base film with the material in a state in which flares (sags) that occurred at the both end parts of the base film have been reduced.

Accordingly, the configuration makes it possible to provide a device for producing a separator which device is capable of coating a base film with a material for a functional layer by a coating section so that the material has a uniform film thickness.

Advantageous Effects of Invention

An aspect of the present invention brings about an effect of providing a method and a device for producing a separator, each capable of coating a base film with a material for a functional layer in a coating step so that the material has a uniform film thickness.

Figure 8:
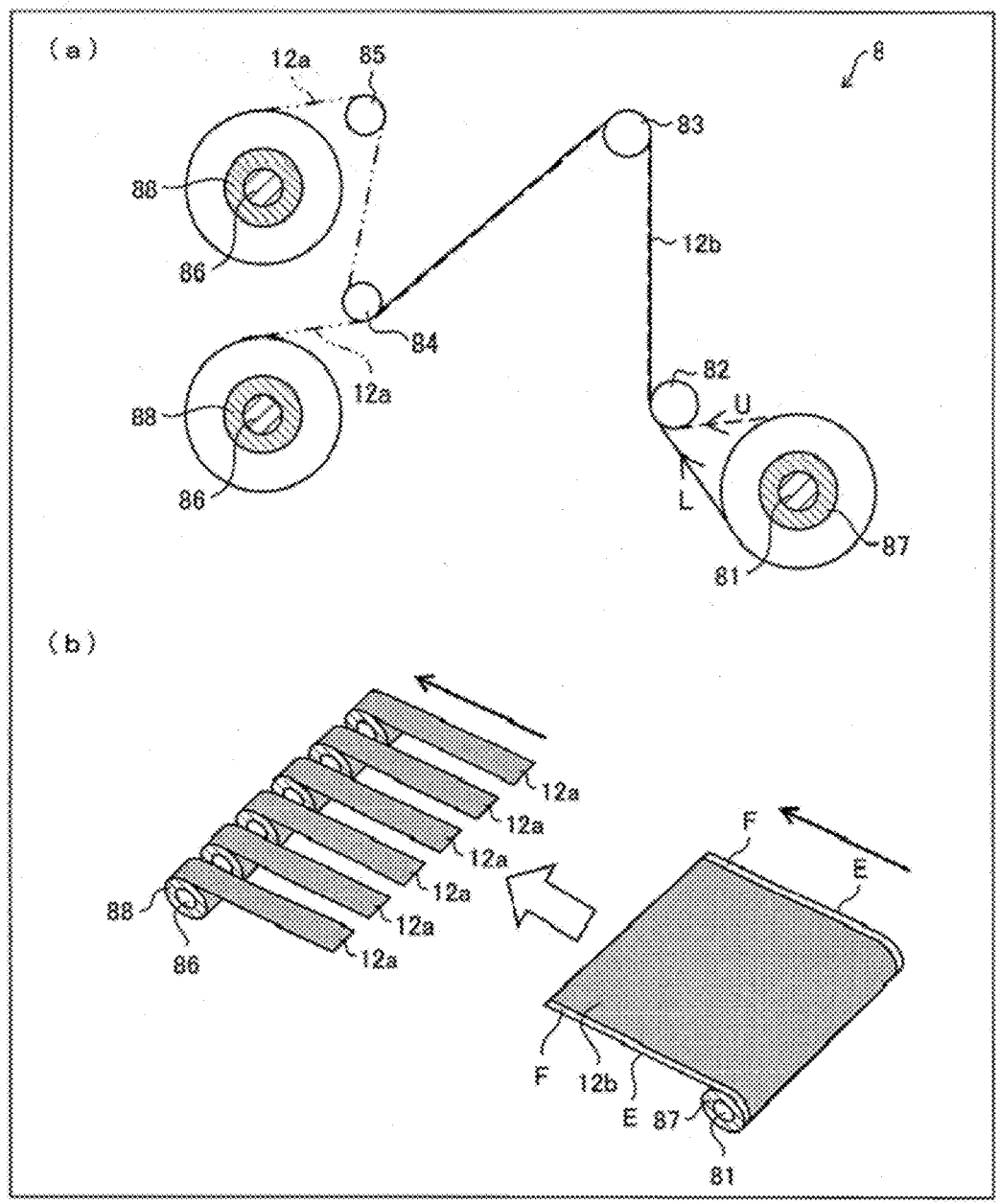

(a) of FIG. 8 is a cross-sectional view illustrating a configuration of a slitting apparatus for slitting a heat-resistant separator original sheet. (b) of FIG. 8 is a perspective view illustrating states before and after the heat-resistant separator original sheet is slit.

DESCRIPTION OF EMBODIMENTS

The following description will discuss an embodiment of the present invention by using, as an example, a separator film (separator) for a lithium-ion secondary battery.

First, the lithium-ion secondary battery will be discussed with reference to FIGS. 1 through 3.

[Configuration of Lithium Ion Secondary Battery]

A nonaqueous electrolyte secondary battery, typically, a lithium-ion secondary battery has a high energy density, and therefore, is currently widely used not only as batteries for use in devices such as personal computers, mobile phones, and mobile information terminals, and for use in moving bodies such as automobiles and airplanes, but also as stationary batteries contributing to stable power supply.

Figure 1:
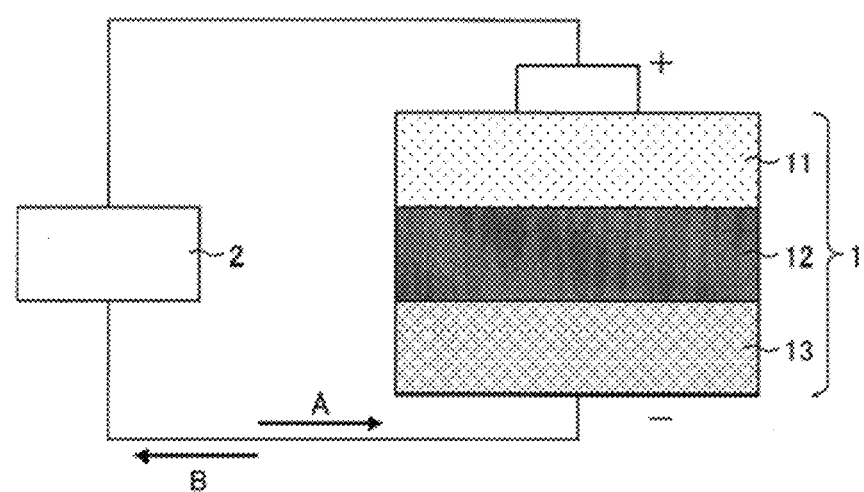
FIG. 1 is a diagram schematically illustrating a cross sectional configuration of a lithium-ion secondary battery.

FIG. 1 is a diagram schematically illustrating a cross sectional configuration of a lithium-ion secondary battery 1. As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. Then, while the lithium-ion secondary battery 1 is being charged, electrons move in a direction A. On the other hand, while the lithium-ion secondary battery 1 is being discharged, electrons move in a direction B.

(Separator)

The separator 12 is provided so as to be sandwiched between the cathode 11 which is a positive electrode of the lithium-ion secondary battery 1 and the anode 13 which is a negative electrode of the lithium-ion secondary battery 1. The separator 12 separates the cathode 11 and the anode 13, allowing lithium ions to move between the cathode 11 and the anode 13. For example, polyolefin such as polyethylene or polypropylene is used as a material of the separator 12.

Figure 2:
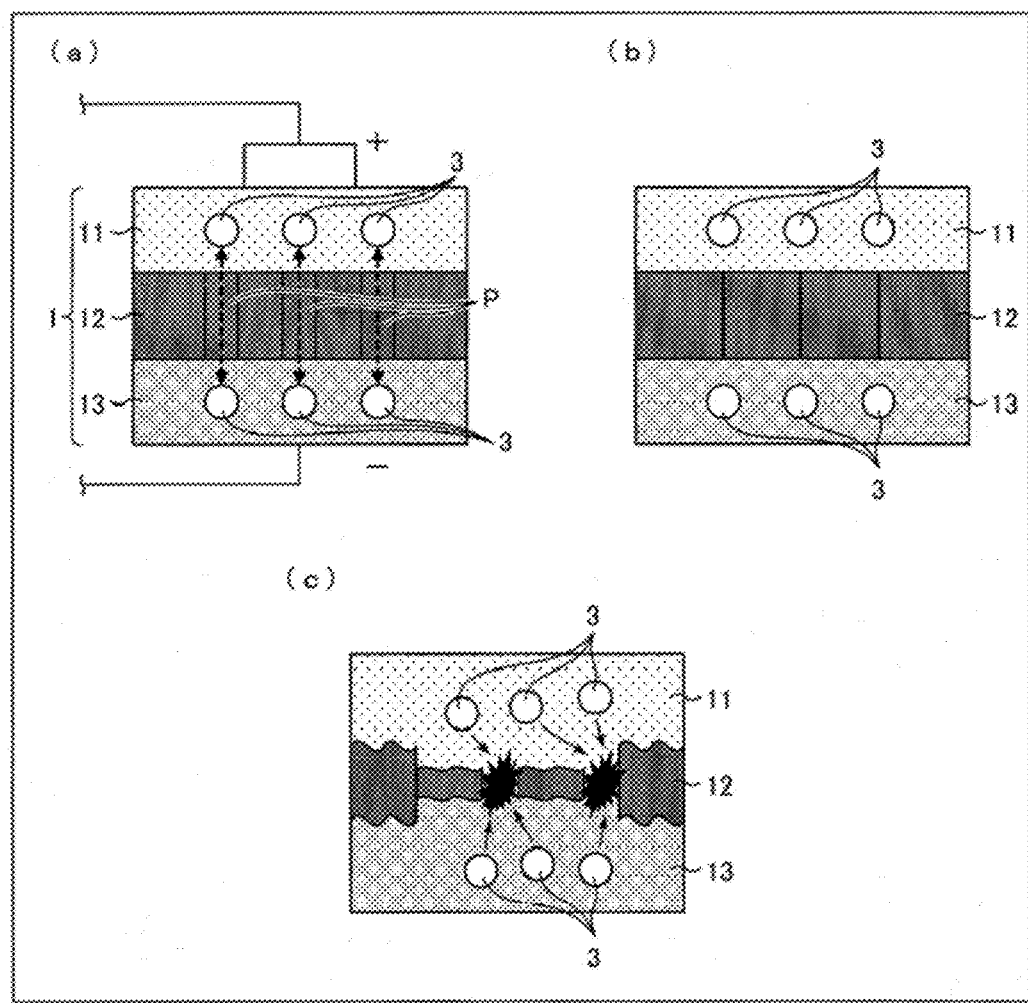
FIG. 2 provides diagrams each schematically illustrating a state of the lithium-ion secondary battery illustrated in FIG. 1.

FIG. 2 provides diagrams each schematically illustrating a state of the lithium-ion secondary battery 1 illustrated in FIG. 1. (a) of FIG. 2 illustrates a normal state. (b) of FIG. 2 illustrates a state in which a temperature of the lithium-ion secondary battery 1 has risen. (c) of FIG. 2 illustrates a state in which a temperature of the lithium-ion secondary battery 1 has sharply risen.

As illustrated in (a) of FIG. 2, the separator 12 is provided with many pores P. Normally, lithium ions 3 in the lithium-ion secondary battery 1 can move back and forth through the pores P.

However, there are, for example, cases in which the temperature of the lithium-ion secondary battery 1 rises due to excessive charging of the lithium-ion secondary battery 1, a high current caused by short-circuiting of the external device, or the like. In such cases, the separator 12 melts or softens and the pores P are blocked as illustrated in (b) of FIG. 2. As a result, the separator 12 shrinks. This stops the back-and-forth movement of the lithium ions 3, and consequently stops the above temperature rise.

However, in a case where a temperature of the lithium-ion secondary battery 1 sharply rises, the separator 12 suddenly shrinks. In this case, as illustrated in (c) of FIG. 2, the separator 12 may be destroyed. Then, the lithium ions 3 leak out from the separator 12 which has been destroyed. As a result, the lithium ions 3 do not stop moving back and forth. Consequently, the temperature continues rising.

(Heat-Resistant Separator)

Figure 3:
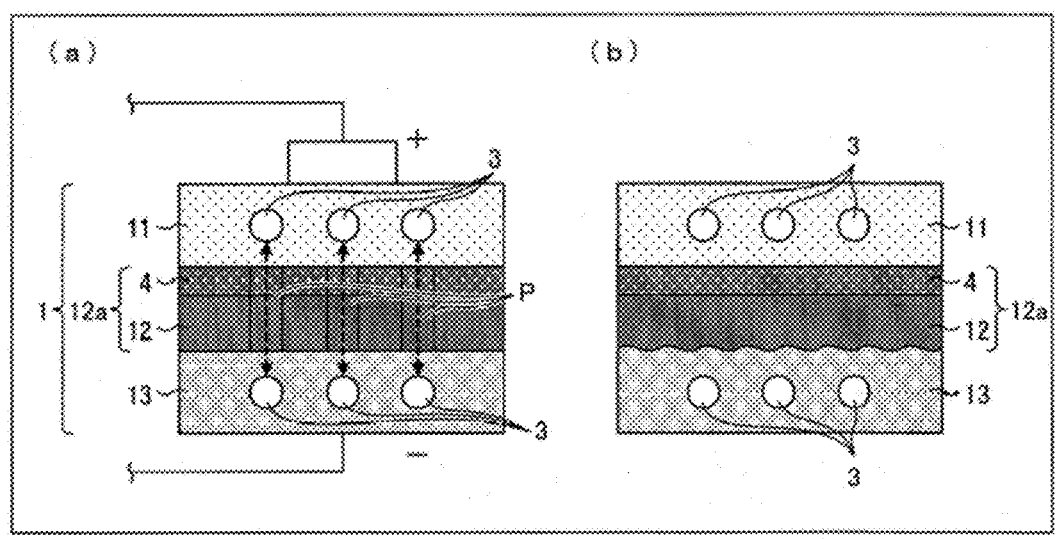
FIG. 3 provides diagrams each schematically illustrating a state of a lithium-ion secondary battery having another configuration.

FIG. 3 provides diagrams each schematically illustrating a state of a lithium-ion secondary battery 1 having another configuration. (a) of FIG. 3 illustrates a normal state, and (b) of FIG. 3 illustrates a state in which a temperature of the lithium-ion secondary battery 1 has sharply risen.

As illustrated in (a) of FIG. 3, the lithium-ion secondary battery 1 can further include a heat-resistant layer 4. The heat-resistant layer 4 can be provided to the separator 12. (a) of FIG. 3 illustrates a configuration in which the separator 12 is provided with the heat-resistant layer 4 serving as a functional layer. A film in which the separator 12 is provided with the heat-resistant layer 4 is hereinafter referred to as a heat-resistant separator (separator) 12a.

In the configuration illustrated in (a) of FIG. 3, the heat-resistant layer 4 is laminated on a surface of the separator 12 which surface is on a cathode 11 side. Note that the heat-resistant layer 4 can alternatively be laminated on a surface of the separator 12 which surface is on an anode 13 side, or both surfaces of the separator 12. Further, the heat-resistant layer 4 is provided with pores which are similar to the pores P. Normally, the lithium ions 3 move back and forth through the pores P and the pores of the heat-resistant layer 4. The heat-resistant layer 4 contains, for example, wholly aromatic polyamide (aramid resin) as a material.

As illustrated in (b) of FIG. 3, even in a case where the temperature of the lithium-ion secondary battery 1 sharply rises and as a result, the separator 12 melts or softens, the shape of the separator 12 is maintained because the heat-resistant layer 4 supports the separator 12. Therefore, such a sharp temperature rise results in only melting or softening of the separator 12 and consequent blocking of the pores P. This stops the back-and-forth movement of the lithium ions 3 and consequently stops the above-described excessive discharging or excessive charging. In this way, the separator 12 can be prevented from being destroyed.

[Flow for Producing Separator]

The following description will discuss a flow for producing a separator.

Figure 4:
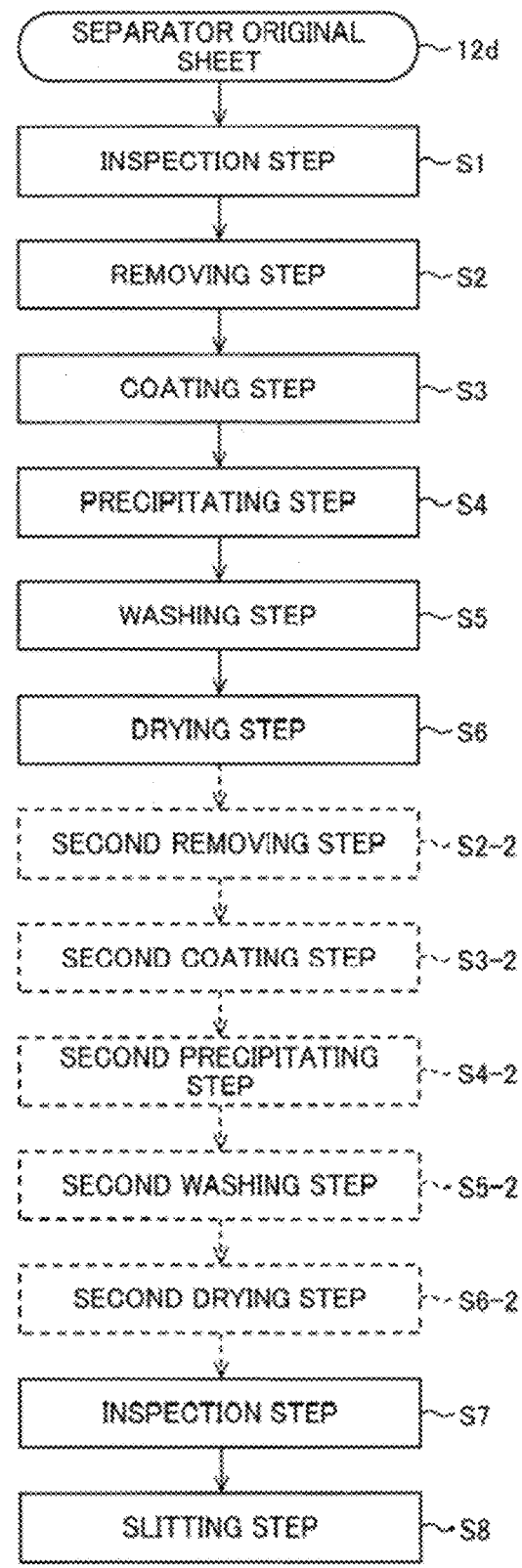
FIG. 4 is a flow chart schematically showing a method for producing a separator.

FIG. 4 is a flow chart schematically showing a method for producing a separator. The separator is configured such that a functional layer is laminated on a separator original sheet (base film) which serves as a base. A film made of polyethylene or the like is used for the separator original sheet. Examples of the functional layer encompass a heat-resistant layer and an adhesive layer.

The functional layer is laminated on the separator original sheet by (i) coating the separator original sheet with coating (a material) or the like corresponding to the functional layer and then (ii) drying the separator original sheet.

FIG. 4 shows, as an example, a flow for producing the heat-resistant separator 12a in a case where the functional layer is the heat-resistant layer 4. The flow shown in FIG. 4 is an example of a flow in which wholly aromatic polyamide (aramid resin) employed as a material for the heat-resistant layer 4 is laminated on a polyethylene base film which is a separator original sheet (base film) 12d.

The above flow includes an inspection step S1, a removing step S2, a coating step S3, a precipitating step S4, a washing step S5, a drying step S6, an inspection step S7, and a slitting step S8.

Note that a method for producing a separator in accordance with an aspect of the present invention can include, before the inspection step S1, a step of producing the separator original sheet 12d. Further, the inspection step S1 can be omitted. Alternatively, the inspection step S1 can be carried out between the removing step S2 and the coating step S3.

The method for producing a separator in accordance with an aspect of the present invention can include a second removing step S2-2 after the drying step S6. In this case, a flow for producing a separator includes the inspection step S1, the removing step S2, the coating step S3, the precipitating step S4, the washing step S5, the drying step S6, the second removing step S2-2, the inspection step S7, and the slitting step S8.

In the method for producing a separator in accordance with an aspect of the present invention, the precipitating step S4 and the washing step S5 can be omitted. This is because the precipitating step S4 and the washing step S5 can be unnecessary depending on a configuration of the functional layer and a configuration of coating used in the coating step S3. In this case, a flow for producing a separator includes the inspection step S1, the removing step S2, the coating step S3, the drying step S6, the inspection step S7, and the slitting step S8.

The method for producing a separator in accordance with an aspect of the present invention can include, after the drying step S6, the second removing step S2-2, a second coating step S3-2, a second precipitating step S4-2, a second washing step S5-2, and a second drying step S6-2. In this case, a flow for producing a separator includes the inspection step S1, the removing step S2, the coating step S3, the precipitating step S4, the washing step S5, the drying step S6, the second removing step S2-2, the second coating step S3-2, the second precipitating step S4-2, the second washing step S5-2, the second drying step S6-2, the inspection step S7, and the slitting step S8. In the above flow, it is possible to omit (i) the precipitating step S4 and the washing step S5 and (ii) the second precipitating step S4-2 and the second washing step S5-2. This is because, as described above, the precipitating step S4 and the washing step S5 and (ii) the precipitating step S4-2 and the washing step S5-2 can be unnecessary depending on (i) the configuration of the functional layer and (ii) the structure of the coating used in the coating step S3. In this case, a flow for producing a separator includes the inspection step S1, the removing step S2, the coating step S3, the drying step S6, the second removing step S2-2, the second coating step S3-2, the second drying step S6-2, the inspection step S7, and the slitting step S8.

The method for producing a separator in accordance with an aspect of the present invention can further include an additional inspection step between the steps.

(Production Step of Producing Separator Original Sheet)

First, the following description will discuss production of the separator original sheet 12d serving as a base film, by using, as an example, a case where the separator original sheet 12d mainly contains polyethylene as a material.

The following description will discuss, as an example, a production method for producing the separator original sheet 12d in which production method a thermoplastic resin in which a pore forming agent is added is shaped into a film and then the pore forming agent is removed by use of an appropriate solvent. Specifically, in a case where a polyethylene resin containing an ultrahigh molecular weight polyethylene is used as a material of the separator original sheet 12d, steps (A) through (D) below are sequentially carried out in the production method.

(A) Kneading Step

A step of obtaining a polyethylene resin composition by kneading an ultrahigh molecular weight polyethylene and an inorganic filler such as a calcium carbonate.

(B) Rolling Step

A step of forming a film by use of the polyethylene resin composition obtained in the kneading step.

(C) Removal Step

A step of removing the inorganic filler from the film obtained in the rolling step.

(D) Stretching Step

A step of obtaining the separator original sheet 12d by stretching the film obtained in the removal step.

According to the above production method, in the removal step (C), many fine pores are provided in the film. The fine pores of the film stretched in the stretching step (D) become the above-described pores P. The separator original sheet 12d formed as a result is a polyethylene microporous film having a prescribed thickness and a prescribed air permeability.

In the kneading step (A), 100 parts by weight of the ultrahigh molecular weight polyethylene, 5 parts by weight to 200 parts by weight of a low-molecular weight polyolefin having a weight-average molecular weight of not more than 10000, and 100 parts by weight to 400 parts by weight of the inorganic filler can be kneaded.

Note that even in a case where the separator original sheet 12d contains another material, the separator original sheet 12d can be produced by similar production steps. The method for producing the separator original sheet 12d is not limited to the method in which the pore forming agent is removed, and various methods can be used for producing the separator original sheet 12d.

The following description will sequentially discuss the steps S1 through S8 which are subsequent to the production step of producing the separator original sheet 12d. Note that the steps S1 through S8 are carried out in this order.

(Inspection Step S1)

The inspection step S1 is a step of inspecting, before a subsequent step, the separator original sheet 12d which serves as a base of the heat-resistant separator 12a.

(Removing Step S2)

The removing step S2 is a step of removing, from the separator original sheet 12d which has been inspected in the inspection step S1, both end parts (edge parts) of the separator original sheet 12d in a width direction thereof. In other words, the removing step S2 is a step of removing both end parts of the separator original sheet 12d which both end parts face each other in a direction substantially perpendicular to a transferring (longitudinal) direction of the separator original sheet 12d.

As described above, the separator original sheet 12d tends to sag at an end part thereof while being transferred, and this causes a flare at the end part. In a case where a flare occurs at the end part of the separator original sheet 12d, coating for the heat-resistant layer 4, with which the separator original sheet 12d is coated in the coating step S3, has a non-uniform film thickness.

Therefore, Embodiment 1 involves removing the both end parts, at each of which a flare has occurred, from the separator original sheet 12d in the removing step S2, before the coating step S3.

Figure 5:
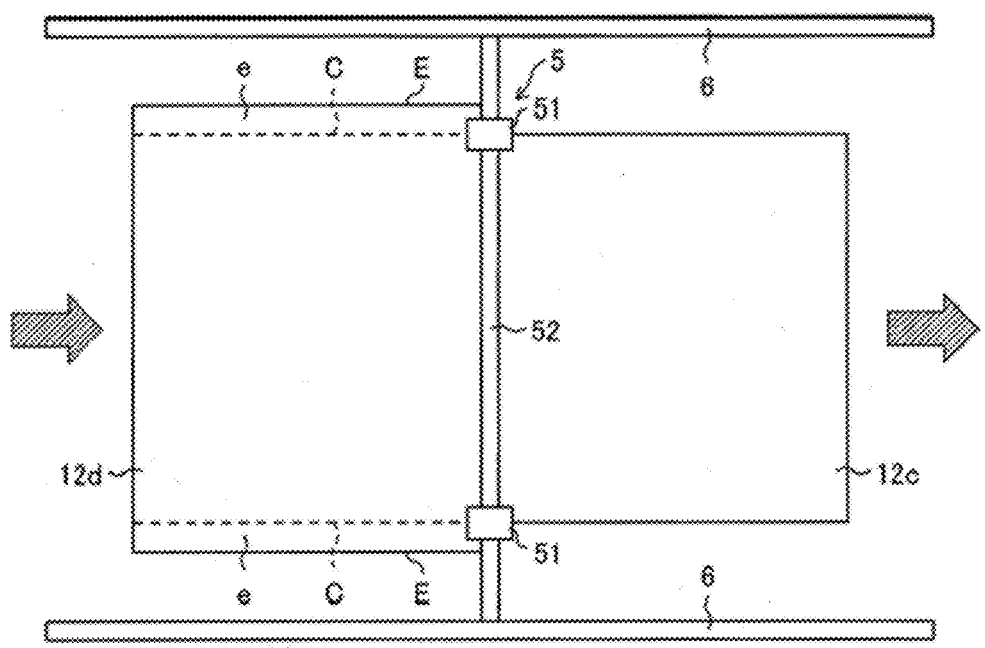
FIG. 5 is a top surface view illustrating an example of a removing step shown in FIG. 4.

FIG. 5 is a top surface view illustrating an example of the removing step S2 shown in FIG. 4. As illustrated in FIG. 5, the removing step S2 is carried out by a removing device (removing section) 5 for removing both end parts (removal parts) e of the separator original sheet 12d.

The removing device 5 includes (i) two cutting sections (first cutting section, second cutting section) 51 for removing (cutting off) the respective both end parts e of the separator original sheet 12d and (ii) a fixing shaft 52 for fixing the cutting sections 51.

The fixing shaft 52 has a substantially linear shape extending in the width direction of the separator original sheet 12d. Both end parts of the fixing shaft 52 are fixed to respective fixing sections 6 that are provided on respective both sides of the removing device 5 so as to sandwich the removing device 5.

As described above, in the removing device 5, the fixing shaft 52 for fixing the cutting sections 51 has a substantially linear shape, and the two cutting sections 51 are fixed to the single fixing shaft 52. This allows the cutting sections 51 to be more stable as compared with, for example, a case where the two cutting sections 51 are fixed to respective different members. This allows the cutting sections 51 to appropriately remove the both end parts e of the separator original sheet 12d at respective removal positions C.

The cutting sections 51 can each be configured to be fixable at a given position on the fixing shaft 52. This makes it possible to set a width of the separator original sheet 12d to a given value in the removing step S2.

Figure 6:
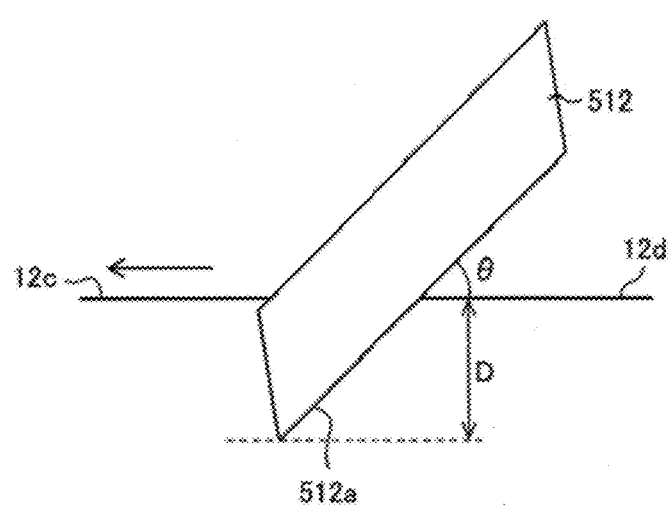
FIG. 6 is a cross-sectional view illustrating a positional relationship between (i) a razor blade included in each of cutting sections illustrated in FIG. 5 and (ii) a separator original sheet.

The cutting sections 51 each include a razor blade 512 (see FIG. 6). The razor blade 512 removes corresponding one of the both end parts e of the separator original sheet 12d by a blade edge 512a that has been sharpened. This makes it possible to provide a separator original sheet (base film) 12c which (i) is obtained by removing, from the separator original sheet 12d, the both end parts e at each of which a flare has occurred and (ii) is thus flat.

FIG. 6 is a cross-sectional view illustrating a positional relationship between (i) the razor blade 512 included in each of the cutting sections 51 illustrated in FIG. 5 and (ii) the separator original sheet 12d. As illustrated in FIG. 6, the razor blade 512 is provided so as to be obliquely inclined with respect to the separator original sheet 12d so that the blade edge 512a forms an angle θ with respect to the separator original sheet 12d that is being transferred.

The razor blade 512 used in Embodiment 1 is a long blade having a blade length greater than that of a slitting razor blade (short blade) which is typically used in production of a separator. Accordingly, in a case where a distance between a bottom surface of the separator original sheet 12d and a lower end part (cutting point) of the blade edge 512a is defined as a depth D, it is possible to set the depth D to be greater as compared with a conventional razor blade.

By setting the depth D to be thus greater, it is possible to appropriately remove, from the separator original sheet 12d by using the razor blade 512, the both end parts e at each of which a flare has occurred.

Note that a width of a flare (i.e., a width of the flare as measured in an out-of-plane direction of the separator original sheet 12d) varies in accordance with factors such as a size, a transferring speed, and an unwinding tension of the separator original sheet 12d. Accordingly, a value of the depth D is set as appropriate in accordance with a width of a flare that has occurred at each of the both end parts e of the separator original sheet 12d.

The value of the depth D is preferably not smaller than a quarter of a distance between (i) each of both end sides E of the separator original sheet 12d, which is being transferred, in the width direction of the separator original sheet 12d and (ii) corresponding one of the removal positions C at each of which the razor blade 512 is brought into contact with the separator original sheet 12d. In a case where the value of the depth D is not smaller than a quarter of the above distance, it is possible to more appropriately remove, from the separator original sheet 12d by using the razor blade 512, the both end parts e at each of which a flare has occurred.

An upper limit of the depth D is preferably equal to the above distance. In a case where the value of the depth D exceeds the above distance, (i) it is difficult to secure a space sufficient for mounting the cutting sections 51, due to a configuration of the removing device 5 and (ii) the blade edge 512a of the razor blade 512 is used less efficiently. It is therefore not reasonable to set the value of the depth D to be greater than the above distance.

A width of each of the removal parts (both end parts e) removed in the removing step S2 is preferably not smaller than 5 mm but not greater than 200 mm. In terms of a reliable removal of a part in which a flare can occur, the width of each of the removal parts (both end parts e) removed in the removing step S2 is preferably not smaller than 5 mm, more preferably not smaller than 8 mm, and still more preferably not smaller than 10 mm. Meanwhile, in terms of a yield of a product which is obtained after the removal parts are removed, the above width is preferably not greater than 200 mm, and more preferably not greater than 150 mm. The removal parts (both end parts e) each having a width of less than 5 mm is unsuitable because, in such a case, it is difficult to remove the both end parts e from the separator original sheet 12d which is thin and low in strength.

The removal parts that are removed in the removing step S2 can have respective different widths. In a case where a removal part in which a flare is more likely to occur is removed by a larger portion, it is possible to prevent an occurrence of a flare without reducing an overall yield in the production of separators.

Note that a type of the blade used in the removing step S2 is not particularly limited and various types of blades can be used, provided that it is possible to remove, by the blade, the both end parts e of the separator original sheet 12d. For example, instead of the razor blade 512, it is possible to use a blade such as a circular blade.

(Coating Step S3)

The coating step S3 is a step of coating, with coating (a material) for the heat-resistant layer 4, a separator original sheet 12c which is obtained by removing the both end parts e from the separator original sheet 12d in the removing step S2. In the coating step S3, it is possible to carry out the coating with respect to only one surface of the separator original sheet 12c or both surfaces of the separator original sheet 12c. In a case where the coating is carried out with respect to only one surface of the separator original sheet 12c, it is possible to further carry out coating with respect to the other surface of the separator original sheet 12c in the second coating step S3-2 described later.

For example, in the coating step S3, the separator original sheet 12c is coated with a solution in which aramid is dissolved in NMP (N-methylpyrrolidone), as coating for the heat-resistant layer. Note that the heat-resistant layer 4 is not limited to an aramid heat-resistant layer. For example, it is possible to coat the separator original sheet 12c with a suspension of alumina, carboxymethyl cellulose, and water, as the coating for the heat-resistant layer.

According to Embodiment 1, no other step is carried out between the removing step S2 and the coating step S3, and after the both end parts e at each of which a flare has occurred are removed in the removing step S2, the coating is carried out with respect to the separator original sheet 12c in the coating step S3, which is subsequent to the removing step S2. This makes it possible to carry out the coating with respect to the separator original sheet 12c while suitably maintaining flatness of the separator original sheet 12c. Accordingly, it is possible to coat the separator original sheet 12c with the material for the heat-resistant layer 4 so that the material has a more uniform film thickness.

Note, however, that another step (e.g., a winding step etc.) can be carried out between the removing step S2 and the coating step S3. Even in a case where another step is carried out between the removing step S2 and the coating step S3, it is possible, by carrying out the removing step S2 of removing the both end parts e of the separator original sheet 12d before the coating step S3, to coat the separator original sheet 12c with the material for the heat-resistant layer 4 so that the material has a more uniform film thickness as compared with a case where the removing step S2 is not carried out.

Figure 7:
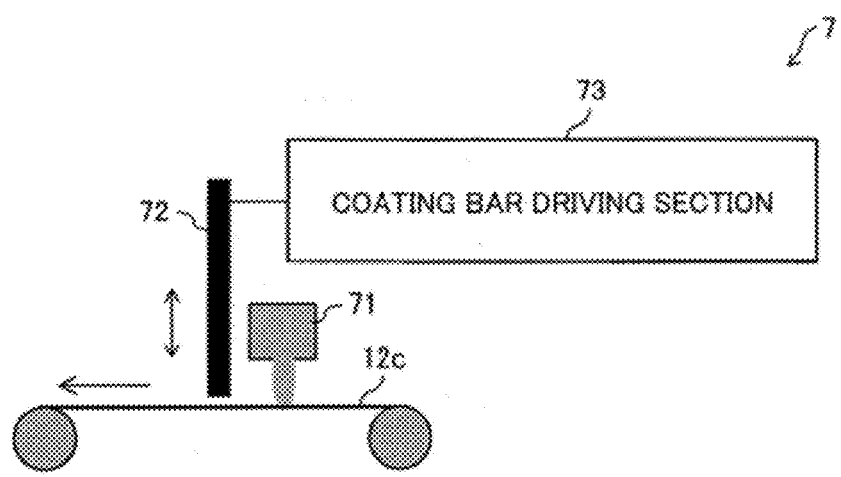
FIG. 7 is a cross-sectional view showing an example of a coating step shown in FIG. 4.

FIG. 7 is a cross-sectional view showing an example of the coating step S3 shown in FIG. 4. As shown in FIG. 7, the coating step S3 is carried out by a coating device (coating section) 7 for coating, with coating 74 for the heat-resistant layer, the separator original sheet 12c which is obtained by removing the both end parts e from the separator original sheet 12d in the removing step S2.

The coating device 7 has a mechanism of a bar coater method and includes a coating dropper 71, a coating bar 72, and a coating bar driving section 73. According to the mechanism, the coating is carried out with respect to the separator original sheet 12c in the following manner. That is, a gap (clearance) is provided between a tip of the coating bar 72 and the separator original sheet 12c, and the separator original sheet 12c is transferred while coating 74 that has been dropped from the coating dropper 71 onto the separator original sheet 12c is being accumulated on one side of the coating bar 72 (i.e., upstream of the coating bar 72 in a transferring direction of the separator original sheet 12c).

Note that a method for coating the separator original sheet 12c with the coating 74 is not specifically limited as long as uniform wet coating can be performed with respect to the separator original sheet 12c by the method. The method can be any of various methods such as a capillary coating method, a slit die coating method, a spray coating method, a dip coating method, a roll coating method, a screen printing method, a flexo printing method, a bar coater method, a gravure coater method, or a die coater method.

A material for the heat-resistant layer 4 with which material the separator original sheet 12c is coated has a film thickness that can be controlled by adjusting a thickness of a coating wet film and a solid-content concentration in the coating solution.

In the coating step S3, the separator original sheet 12c obtained by removing the both end parts e from the separator original sheet 12d is preferably coated with the coating 74 so that surfaces of respective both edge parts of the separator original sheet 12c in a width direction of the separator original sheet 12c are left uncoated as uncoated parts (edge-uncoated coating). This can prevent the coating from flowing around from the both end parts of the separator original sheet 12c to a back surface of the separator original sheet 12c, unlike in a case where an entire surface coating is carried out so that the coating 74 is applied to the separator original sheet 12c so as to cover up to the surfaces of the respective both edge parts of the separator original sheet 12c. Accordingly, it is possible to reduce a product defect which is caused when the coating 74 flows around to the back surface of the separator original sheet 12c.

In this case, the uncoated parts can be removed in a step to be carried out later (e.g., the second removing step S2-2, the slitting step S8, etc. (described later)). This makes it possible to produce the heat-resistant separator 12a in which the heat-resistant layer 4 has a more uniform film thickness.

(Precipitating Step S4)

The precipitating step S4 is a step of solidifying the coating 74 with which the separator original sheet 12c has been coated in the coating step S3. In a case where the coating 74 is an aramid coating, for example, water vapor is applied to a coated surface so that aramid is solidified by humidity precipitation. This provides a heat-resistant separator original sheet 12b (see FIG. 8) in which the heat-resistant layer 4 is formed on the separator original sheet 12c.

(Washing Step S5)

The washing step S5 is a step of washing the heat-resistant separator original sheet 12b in which the coating has been solidified in the precipitating step S4. In a case where the heat-resistant layer 4 is an aramid heat-resistant layer, for example, water, an aqueous solution, or an alcohol-based solution is suitably used as a washing liquid.

(Drying Step S6)

The drying step S6 is a step of drying the heat-resistant separator original sheet 12b that has been washed in the washing step S5. A method for drying the heat-resistant separator original sheet 12b is not particularly limited, and, for example, it is possible to use various methods such as a method in which the heat-resistant separator original sheet 12b is brought into contact with a heated roll or a method in which hot air is blown onto the heat-resistant separator original sheet 12b.

(Second Removing Step S2-2)

A method for producing the heat-resistant separator 12a can include, after the drying step S6, the second removing step S2-2 of further removing both end parts of the heat-resistant separator original sheet 12b. This makes it possible to suitably prevent a wrinkle from occurring on the heat-resistant separator original sheet 12b while the heat-resistant separator original sheet 12b is being transferred.

Particularly, in a case where the edge-uncoated coating has been carried out with respect to the separator original sheet 12c in the coating step S3, there is a level difference (a boundary between a coated part and an uncoated part) at the both end parts of the separator original sheet 12c due to the film thickness of the heat-resistant layer 4. Accordingly, a wrinkle may be caused by the level difference.

In a case where the both end parts, which are uncoated parts, of the heat-resistant separator original sheet 12b are removed in the second removing step S2-2 so that the level difference is eliminated, it is possible to prevent a wrinkle from occurring on the heat-resistant separator original sheet 12b while the heat-resistant separator original sheet 12b is being transferred.

That is, removal parts which are removed in the second removing step S2-2 each preferably include the uncoated part and a part of the coated part. In other words, in order to reliably include the entire uncoated parts in the removal parts, it is preferable to also include, in each of the removal parts, a part of the coated part which part is adjacent to the uncoated part when the both end parts of the heat-resistant separator original sheet 12b are removed in the second removing step S2-2.

For example, in a case where the edge-uncoated coating has been carried out in the coating step S3 so that a part which is approximately 10 mm in width as measured from each of the both end sides E of the separator original sheet 12c is left uncoated as an uncoated part, a part of the coated part which part has a width of not smaller than 5 mm but not greater than 80 mm is removed, in addition to the uncoated part of approximately 10 mm in width, from the separator original sheet 12b at each of the both end sides E of the heat-resistant separator original sheet 12b in the second removing step S2-2. Specific aspect (means) of the second removing step S2-2 is identical to that of the removing step S2.

In terms of (i) a reliable removal of a part in which a flare can occur and (ii) a reliable elimination of a level difference caused by a film thickness of a material (functional layer) with which one surface of the base film has been coated, a width of the part of the coated part which part is removed in the removing step S2-2 is preferably not smaller than 5 mm, more preferably not smaller than 8 mm, and still more preferably not smaller than 10 mm. Meanwhile, in terms of a yield of a product which is obtained after the removal parts are removed, the above width is preferably not greater than 80 mm, and more preferably not greater than 50 mm.

In a case where the heat-resistant separator original sheet 12b includes the heat-resistant layer 4 only on one surface of the heat-resistant separator original sheet 12b, it is possible to form a heat-resistant layer 4 also on the other surface of the resistant separator original sheet 12b by carrying out the second coating step S3-2, the second precipitating step S4-2, the second washing step S5-2, and the second drying step S6-2, subsequent to the second removing step S2-2.

That is, the method for producing a separator in accordance with an aspect of the present invention can be carried out by using, as a base film, the heat-resistant separator original sheet 12b including the heat-resistant layer 4 only on one surface of the heat-resistant separator original sheet 12b.

(Second Coating Step S3-2)

The second coating step S3-2 is a step of coating the other surface of the heat-resistant separator original sheet 12b with coating (a material) for the heat-resistant layer 4. For example, no other step is carried out between the second removing step S2-2 and the second coating step S3-2 and, after the both end parts of the heat-resistant separator original sheet 12b are removed in the second removing step S2-2, the coating is carried out with respect to the other surface of the heat-resistant separator original sheet 12b in the second coating step S3-2, which is subsequent to the second removing step S2-2. As a result, the coating is carried out while flatness of the heat-resistant separator original sheet 12b is suitably maintained. This makes it possible to coat the heat-resistant separator original sheet 12b with the material for the heat-resistant layer 4 so that the material has a more uniform film thickness. Specific aspect (means) of the second coating step S3-2 is identical to that of the coating step S3.

(Second Precipitating Step S4-2)

The second precipitating step S4-2 is a step of solidifying the coating with which the heat-resistant separator original sheet 12b has been coated in the second coating step S3-2. Specific aspect (means) of the second precipitating step S4-2 is identical to that of the precipitating step S4.

(Second Washing Step S5-2)

The second washing step S5-2 is a step of washing the heat-resistant separator original sheet 12b on which the coating has been solidified in the second precipitating step S4-2. Specific aspect (means) of the second washing step S5-2 is identical to that of the washing step S5.

(Second Drying Step S6-2)

The second drying step S6-2 is a step of drying the heat-resistant separator original sheet 12b that has been washed in the second washing step S5-2. Specific aspect (means) of the second drying step S6-2 is identical to that of the drying step S6.

(Inspection Step S7)

The inspection step S7 is a step of inspecting the heat-resistant separator original sheet 12b that has been dried in the drying step S6 (the second drying step S6-2 in a case where the flow includes the drying step S6-2). In a case where the heat-resistant separator original sheet 12b is inspected, it is possible to mark a defective part as appropriate so that the defective part can be easily removed.

(Slitting Step S8)

The slitting step S8 is a step of slitting (cutting) the heat-resistant separator original sheet 12b inspected in the inspection step S7 into parts each having a predetermined product width. Specifically, in the slitting step S8, the heat-resistant separator original sheet 12b is slit into parts each having a product width which is suitable for an applied product such as the lithium-ion secondary battery 1.

In order to increase productivity, the heat-resistant separator original sheet 12b is usually produced so as to have a width that is equal to or greater than the product width. After the heat-resistant separator original sheet 12b is produced, the heat-resistant separator original sheet 12b is slit into heat-resistant separators 12a each having the product width.

In the slitting step S8, it is possible to remove both end parts of the heat-resistant separator original sheet 12b, at the same time as slitting the heat-resistant separator original sheet 12b. In a case where redundant films are removed from the respective both end parts of the heat-resistant separator original sheet 12b in the slitting step S8, it is possible to suitably process the heat-resistant separator original sheet 12b into the heat-resistant separators 12a each having the product width.

In a case where the edge-uncoated coating has been carried out in the coating step S3 (the second coating step S3-2 in a case where the flow includes the second coating step S3-2), uncoated parts F (see FIG. 8) are removed in the slitting step S8. For example, in a case where the edge-uncoated coating has been carried out in the coating step S3 (or the second coating step S3-2) so that a part which is approximately 10 mm in width as measured from each of the both end sides E of the separator original sheet 12c is left uncoated as an uncoated part F, a part of the coated part which part has a width of not smaller than 5 mm but not greater than 80 mm is removed, in addition to the uncoated part F of approximately 10 mm in width, from the heat-resistant separator original sheet 12b at each of the both end sides E of the heat-resistant separator original sheet 12b.

(a) of FIG. 8 is a cross-sectional view illustrating a configuration of a slitting apparatus 8 for slitting the heat-resistant separator original sheet 12b. (b) of FIG. 8 is a perspective view illustrating states before and after the heat-resistant separator original sheet 12b is slit.

As illustrated in (a) of FIG. 8, the slitting apparatus 8 includes a wind-off roller 81, rollers 82 through 85, and a plurality of take-up rollers 86 each of which (i) has a columnar shape and (ii) is rotatably supported. The slitting apparatus 8 further includes a plurality of blades (not illustrated).

In the slitting apparatus 8, a core 87 which has a cylindrical shape and on which the heat-resistant separator original sheet 12b is wound is fitted on the wind-off roller 81. The heat-resistant separator original sheet 12b is unwound from the core 87 to a path U or a path L. The heat-resistant separator original sheet 12b thus unwound is transferred to the roller 84 via the roller 83 at, for example, a speed of 100 m/min. In a step of transferring the heat-resistant separator original sheet 12b, the heat-resistant separator original sheet 12b is slit substantially parallel to a transferring (longitudinal) direction. As a result, a plurality of heat-resistant separators 12a, into which the heat-resistant separator original sheet 12b are slit so as to have the product width, are produced.

As illustrated in (b) of FIG. 8, the plurality of heat-resistant separators 12a thus produced are wound on respective cores 88 fitted on the take-up rollers 86.

Note that the method for producing the heat-resistant separator 12a can include a step other than the steps described above. For example, the method for producing the heat-resistant separator 12a can include a water removing step between the washing step S5 and the drying step S6 or between the second washing step S5-2 and the second drying step S6-2. In the water removing step, water or the like adhered to the heat-resistant separator original sheet 12b is removed in order to prevent the heat-resistant separator original sheet 12b from insufficiently being dried in the subsequent step, i.e., the drying step S6 or the second drying step S6-2.

Alternatively, the method for producing the heat-resistant separator 12a can include, instead of the slitting step S8, a winding step of winding the heat-resistant separator original sheet 12b that has been inspected in the inspection step S7. For example, a core having a cylindrical shape can be used for winding the heat-resistant separator original sheet 12b. The heat-resistant separator original sheet 12b that has been wound can be, for example, shipped as it is with a wide width, as an original sheet of the heat-resistant separator 12a. In this case, the slitting step S8 is omitted.

[Main Points]

As described above, the method for producing the heat-resistant separator 12a in accordance with Embodiment 1 includes: the removing step S2 of removing the both end parts e of the separator original sheet 12d, which is being transferred, in the width direction of the separator original sheet 12d to thereby obtain the separator original sheet 12c; and the coating step S3 of coating the separator original sheet 12c with the coating for forming the heat-resistant layer 4.

With the configuration, the both end parts e of the separator original sheet 12d are removed in the removing step S2, before the coating step S3. This makes it possible to coat the separator original sheet 12c with the coating in a state in which flares (sags) that occurred at each of the both end parts e of the separator original sheet 12d have been reduced.

Therefore, according to Embodiment 1, it is possible to provide a method for producing the heat-resistant separator 12a which method is capable of coating the separator original sheet 12c with the coating for the heat-resistant layer 4 in the coating step S3 so that the coating has a uniform film thickness.

The present invention is not limited to the embodiments, and can be altered by a skilled person in the art within the scope of the claims. An embodiment derived from a proper combination of technical means each disclosed in a different embodiment is also encompassed in the technical scope of the present invention.

[Remarks]

A method for producing a separator in accordance with Embodiment 1 includes: a removing step of removing both end parts of a base film in a width direction of the base film, the base film being transferred; and a coating step of coating, with a material for forming a functional layer, the base film whose both end parts have been removed in the removing step.

With the configuration, the both end parts of the base film (separator original sheet) are removed in the removing step, before the coating step. This makes it possible to coat the base film with the material in a state in which flares (sags) that occurred at each of the both end parts of the base film have been reduced.

Accordingly, the configuration makes it possible to provide a method for producing a separator which method is capable of coating a base film with a material for a functional layer in a coating step so that the material has a uniform film thickness.

Note that, according to Embodiment 1, "a width direction of a base film" means a direction which is (i) substantially perpendicular to a transferring (longitudinal) direction of the base film and (ii) substantially parallel to a surface of the base film.

A method for producing a separator in accordance with Embodiment 1 preferably further includes a second removing step of removing, from the base film having been coated with the material in the coating step, both end parts of the base film in the width direction of the base film.

With the configuration, the both end parts of the base film that has been coated with the material is further removed in the second removing step. This makes it possible to suitably prevent a wrinkle from occurring on the base film while the base film is being transferred.

A method for producing a separator in accordance with Embodiment 1 includes: a removing step of removing both end parts of a base film in a width direction of the base film, the base film being transferred; a coating step of coating, with a material for forming a functional layer, one surface of the base film whose both end parts have been removed in the removing step; a second removing step of removing, from the base film having been coated with the material in the coating step, both end parts of the base film in the width direction of the base film; and a second coating step of coating, with a material for forming a functional layer, the other surface of the base film whose both end parts have been removed in the second removing step.

With the configuration, the both end parts of the base film (separator original sheet) are removed in the removing step, before the coating step. This makes it possible to coat one surface of the base film in the coating step in a state in which flares (sags) that occurred at each of the both end parts of the base film have been reduced.

With the configuration, the both end parts of the base film (separator original sheet) are removed in the second removing step, before the second coating step. This makes it possible to coat the other surface of the base film in the second coating step in a state in which flares (sags) that occurred at each of the both end parts of the base film have been reduced. Further, with the configuration, the both end parts of the base film that has been coated with the material is further removed in the second removing step. This makes it possible to suitably prevent a wrinkle from occurring on the base film while the base film is being transferred.

Accordingly, the configuration makes it possible to provide a method for producing a separator which method is capable of coating both surfaces of a base film with a material for a functional layer so that the material has a uniform film thickness.

The method for producing a separator in accordance with Embodiment 1 is preferably configured such that each of the both end parts of the base film which both end parts are removed in the second removing step includes a part of a coated part of the base film that has been coated with the material in the coating step.

With the configuration, it is possible to eliminate a level difference between a coated part and a non-coated part which level difference is caused by a film thickness of the material (functional layer) with which one surface of the base film has been coated.

Accordingly the configuration makes it possible to prevent a wrinkle caused by the level difference.

The method for producing a separator in accordance with Embodiment 1 is preferably configured such that the part of the coated part which part is removed in the second removing step has a width of not smaller than 5 mm but not greater than 80 mm.

With the configuration, it is possible to appropriately remove the both end parts of the base film which both end parts are located in an area in which a flare can occur. Further, with the configuration, in a case where the both end parts of the base film coated with the material are appropriately removed, it is possible to suitably prevent a wrinkle from occurring on the base film while the base film is being transferred.

The method for producing a separator in accordance with Embodiment 1 is preferably configured such that each of the both end parts of the base film which both end parts are removed in the removing step has a width of not smaller than 5 mm but not greater than 200 mm.

With the configuration, it is possible to appropriately remove the both end parts of the base film which both end parts are located in an area in which a flare can occur.

A method for producing a separator in accordance with Embodiment 1 preferably further includes a slitting step of slitting, into parts each having a predetermined product width, the base film that has been coated with the material.

With the configuration, in a case where the base film is slit into parts each having a predetermined product width in the slitting step, it is possible to obtain a separator in which a functional layer has a uniform film thickness.

The method for producing a separator in accordance with Embodiment 1 is preferably configured such that the slitting step includes removing, at the same time as slitting the base film which has been coated with the material, both end parts of the base film in the width direction of the base film.

With the configuration, in a case where redundant films are removed from the both end parts of the base film in the slitting step, it is possible to suitably process the base film into parts each having a product width.

The method for producing a separator in accordance with Embodiment 1 is preferably configured such that the base film, whose both end parts have been removed in the removing step, is coated with the material in the coating step so that surfaces of respective both edge parts of the base film in the width direction of the base film are left uncoated as uncoated parts.

With the configuration, by carrying out edge-uncoated coating (partial coating) in the coating step in such a manner that the base film is coated with the material so that each of the surfaces of respective both edge parts of the base film in the width direction of the base film are left uncoated as uncoated parts, it is possible to prevent the material from flowing around from the both end parts of the base film to a back surface of the base film, unlike in a case where an entire surface coating is carried out so that the material is applied to the base film so as to cover up to the surfaces of the respective both edge parts of the base film.

Accordingly, the configuration makes it possible to reduce a product defect which is caused when the material flows around from the both end parts of the base film to the back surface of the base film. In a case where the uncoated parts of the base film are removed in a step to be carried out later, it is possible to obtain a separator in which a functional layer has a more uniform film thickness.

The method for producing a separator in accordance with Embodiment 1 is preferably configured such that the removing step and the coating step are successively carried out with respect to the base film being transferred.

With the configuration, the removing step and the coating step are successively carried out with respect to the base film being transferred, with no other step carried out between the removing step and the coating step. Accordingly, after a flare that occurred at the both end parts has been removed in the removing step, the coating is carried out with respect to the base film in the coating step which is subsequent to the removing step.

With the configuration, therefore, the coating is carried out with respect to the base film while flatness of the base film is suitably maintained. This makes it possible to coat the base film with the material for the functional layer in the coating step so that the material has a more uniform film thickness.

A device for producing a separator in accordance with Embodiment 1 includes: a removing section for removing both end parts of a base film in a width direction of the base film, the base film being transferred; and a coating section for coating, with a material for forming a functional layer, the base film whose both end parts have been removed by the removing section.

With the configuration, the both end parts of the base film are removed by the removing section, before the base film is coated with the material by the coating section. This makes it possible to coat the base film with the material in a state in which flares (sags) that occurred at each of the both end parts of the base film have been reduced.

Accordingly, the configuration makes it possible to provide a device for producing a separator which device is capable of coating a base film with a material for a functional layer by a coating section so that the material has a uniform film thickness.

The device for producing a separator in accordance with Embodiment 1 is preferably configured such that the removing section includes: a first cutting section for cutting off one of the both end parts of the base film; a second cutting section for cutting off the other one of the both end parts of the base film; and a fixing shaft that extends in the width direction of the base film and fixes the first cutting section and the second cutting section.

With the configuration, the first cutting section and the second cutting section are fixed to the fixing shaft extending in the width direction of the base film. This allows the first cutting section and the second cutting section to be more stable as compared with, for example, a case where the first cutting section and the second cutting section are fixed to respective different fixing members.

Accordingly, the configuration makes it possible for the first cutting section and the second cutting section to remove the respective both end parts of the base film at appropriate positions.

REFERENCE SIGNS LIST

1: Lithium-ion secondary battery
4: Heat-resistant layer (functional layer)

5: Removing device (removing section)
7: Coating device (coating section)
12: Separator
12a: Heat-resistant separator (separator)
12b: Heat-resistant separator original sheet (base film)
12c: Separator original sheet (base film)
12d: Separator original sheet (base film)
52: Fixing shaft
74: Coating (material)
e: Both end parts (removal part)
F: Uncoated part
S2: Removing step
S2-2: Second removing step
S3: Coating step
S3-2: Second coating step
S8: Slitting step

The invention claimed is:

1. A method for producing a separator, comprising:
a first removing step of removing both end parts of a base film, which is transferred, in a width direction of the base film, the width direction being a direction which is (i) substantially perpendicular to a transferring direction of the base film and (ii) substantially parallel to a surface of the base film;
a first coating step of coating, with a material for forming a functional layer, the base film which has fewer flares by having both end parts of the base film removed in the first removing step; and
a second removing step of removing, from the base film having been coated with the material in the first coating step, both end parts of the base film in the width direction of the base film.

2. A method for producing a separator, comprising:
a first removing step of removing both end parts of a base film, which is transferred, in a width direction of the base film, the width direction being a direction which is (i) substantially perpendicular to a transferring direction of the base film and (ii) substantially parallel to a surface of the base film;
a first coating step of coating, with a material for forming a functional layer, one surface of the base film which has fewer flares by having both end parts of the base film removed in the first removing step;
a second removing step of removing, from the base film having been coated with the material in the first coating step, both end parts of the base film in the width direction of the base film; and
a second coating step of coating, with a material for forming a functional layer, another surface of the base film which has fewer flares by having both end parts of the base film removed in the second removing step.

3. The method for producing a separator as set for in claim 1, wherein each of the both end parts of the base film, from which both end parts are removed in the second removing step, includes a part of a coated part of the base film that has been coated with the material in the first coating step.

4. The method for producing a separator as set forth in claim 3, wherein the part of the coated part, which part is removed in the second removing step, has a width of not smaller than 5 mm but not greater than 80 mm.

5. The method for producing a separator as set forth in claim 1, wherein each of the both end parts of the base film, from which both end parts are removed in the first removing step, has a width of not smaller than 5 mm but not greater than 200 mm.

6. A method for producing a separator as set forth in claim 1, further comprising a slitting step of slitting, into parts each having a predetermined product width, the base film that has been coated with the material.

7. The method for producing a separator as set forth in claim 6, wherein the slitting step includes removing, at the same time as slitting the base film which has been coated with the material, both end parts of the base film in the width direction of the base film.

8. The method for producing a separator as set forth in claim 1, wherein the base film, whose both end parts have been removed in the first removing step, is coated with the material in the first coating step so that surfaces of respective both edge parts of the base film in the width direction of the base film are left uncoated as uncoated parts.

9. The method for producing a separator as set forth in claim 1, wherein the first removing step and the first coating step are successively carried out with respect to the base film being transferred.

10. A device for producing a separator, comprising:
a first removing section for removing both end parts of a base film which is transferred, in a width direction of the base film, the width direction being a direction which is (i) substantially perpendicular to a transferring direction of the base film and (ii) substantially parallel to a surface of the base film;
a coating section for coating, with a material for forming a functional layer, the base film which has fewer flares by having both end parts of the base film removed by the first removing section; and
a second removing section for removing, from the base film having been coated with the material by the coating section, both end parts of the base film in the width direction of the base film.

11. The device for producing a separator as set forth in claim 10, wherein the first removing section includes:
a first cutting section for cutting off one of the both end parts of the base film;
a second cutting section for cutting off the other one of the both end parts of the base film; and
a fixing shaft that extends in the width direction of the base film and fixes the first cutting section and the second cutting section.

* * * * *